United States Patent
Long

(10) Patent No.: US 10,165,618 B2
(45) Date of Patent: Dec. 25, 2018

(54) SERVICE PROCESSING METHOD AND DEVICE

(71) Applicant: Huawei Technologies Co., Ltd., Shenzhen (CN)

(72) Inventor: Sirui Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 15/199,206

(22) Filed: Jun. 30, 2016

(65) Prior Publication Data
US 2016/0316515 A1 Oct. 27, 2016

Related U.S. Application Data

(63) Continuation of application No. PCT/CN2013/091168, filed on Dec. 31, 2013.

(51) Int. Cl.
H04W 76/30 (2018.01)
H04L 12/24 (2006.01)
H04L 29/06 (2006.01)
H04W 76/11 (2018.01)

(52) U.S. Cl.
CPC ......... *H04W 76/30* (2018.02); *H04L 41/0893* (2013.01); *H04L 65/1006* (2013.01); *H04L 65/1016* (2013.01); *H04W 76/11* (2018.02)

(58) Field of Classification Search
CPC ..... H04W 76/30; H04W 76/06; H04W 76/11; H04W 76/021; H04L 41/0893; H04L 65/1006; H04L 65/1016
See application file for complete search history.

(56) References Cited

U.S. PATENT DOCUMENTS

| | | |
|---|---|---|
| 2011/0164566 A1 | 7/2011 | Xiong |
| 2011/0299429 A1* | 12/2011 | Tiwari ............ H04W 36/0022 370/259 |
| 2012/0069733 A1 | 3/2012 | Ye et al. |

(Continued)

FOREIGN PATENT DOCUMENTS

| | | |
|---|---|---|
| CN | 101610201 A | 12/2009 |
| CN | 101686563 A | 3/2010 |

(Continued)

OTHER PUBLICATIONS

Partial English Translation and Abstract of Chinese Patent Application No. CN101730125, dated Jun. 9, 2010, 5 pages.

(Continued)

*Primary Examiner* — Derrick W Ferris
*Assistant Examiner* — Kevin H Lee
(74) *Attorney, Agent, or Firm* — Conley Rose, P.C.

(57) ABSTRACT

The present disclosure discloses a service processing method and device. In this way, when determining that an exception occurs in the packet data network gateway (PGW), the serving gateway (SGW) no longer needs to send the fact that an exception occurs in the PGW to the mobility management entity (MME), thereby reducing a signaling transmission amount in a system, and simplifying a service processing procedure. Moreover, because different deletion policies are used, service processing is accelerated, service processing efficiency of the system is further improved, and user experience is improved.

20 Claims, 6 Drawing Sheets

(56) References Cited

U.S. PATENT DOCUMENTS

| | | | |
|---|---|---|---|
| 2012/0147839 A1 | 6/2012 | Yin et al. | |
| 2012/0294155 A1* | 11/2012 | Yin | H04W 24/04 370/242 |
| 2013/0042011 A1* | 2/2013 | Sugizaki | H04W 4/005 709/227 |
| 2014/0349602 A1* | 11/2014 | Majumdar | H04W 76/50 455/404.1 |
| 2016/0380802 A1* | 12/2016 | Kunz | H04L 65/1016 370/216 |

FOREIGN PATENT DOCUMENTS

| | | |
|---|---|---|
| CN | 101730062 A | 6/2010 |
| CN | 101730125 A | 6/2010 |
| CN | 102413562 A | 4/2012 |
| CN | 102413584 A | 4/2012 |
| CN | 102625475 A | 8/2012 |
| WO | 2011095256 A1 | 8/2011 |

OTHER PUBLICATIONS

Partial English Translation and Abstract of Chinese Patent Application No. CN102413562, dated Apr. 11, 2012, 5 pages.
Partial English Translation and Abstract of Chinese Patent Application No. CN102413584, dated Apr. 11, 2012, 6 pages.
Partial English Translation and Abstract of Chinese Patent Application No. CN101686563, Part 1, dated Mar. 31, 2010, 9 pages.
Partial English Translation and Abstract of Chinese Patent Application No. CN101686563, Part 2, dated Mar. 31, 2010, 2 pages.
"3rd Generation Partnership Project; Technical Specification Group Core Network and Terminals; Restoration procedures (Release 11),"
3GPP TS 23.007, Technical Specification, V11.0.0, Dec. 2011, 56 pages.
3rd Generation Partnership Project; Technical Specification Group Core Network and Terminals; Study of EPC Nodes Restoration (Release 11), 3GPP TR 23.857, Technical Specification, V1.6.0, Nov. 2011, 58 pages.
"Series H: Audiovisual and Multimedia Systems, Infrastructure of audiovisual services—Systems and Terminal Equipment for Audiovisual Services, Packet-Based Multimedia Communications Systems, Amendment 1: Use of Facility message to enable call transfer," ITU-T, H.323, Amendment 1, Mar. 2013, 8 pages.
Foreign Communication From a Counterpart Application, European Application No. 13900596.1, Extended European Search Report dated Jan. 2, 2017, 8 pages.
Foreign Communication From a Counterpart Application, Chinese Application No. 201380002817.6, Chinese Office Action dated Oct. 25, 2016, 8 pages.
Foreign Communication From a Counterpart Application, PCT Application No. PCT/CN2013/091168, English Translation of International Search Report dated Sep. 30, 2014, 2 pages.
Foreign Communication From a Counterpart Application, PCT Application No. PCT/CN2013/091168, English Translation of Written Opinion dated Sep. 30, 2014, 7 pages.
"3rd Generation Partnership Project; Technical Specification Group Core Network and Terminals; Restoration procedures (Release 12)," 3GPP TS 23.007, V12.3.0, Dec. 2013, 85 pages.
Foreign Communication From a Counterpart Application, Korean Application No. 10-2016-7020909, Korean Office Action dated Feb. 2, 2018, 5 pages.
Foreign Communication From a Counterpart Application, Korean Application No. 10-2016-7020909, English Translation of Korean Office Action dated Feb. 2, 2018, 3 pages.

* cited by examiner

SERVICE PROCESSING METHOD AND DEVICE

CROSS-REFERENCE TO RELATED APPLICATIONS

This application is a continuation of International Patent Application No. PCT/CN2013/091168, filed on Dec. 31, 2013, which is hereby incorporated by reference in its entirety.

TECHNICAL FIELD

The present disclosure relates to the field of wireless communications technologies, and in particular, to a service processing method and device.

BACKGROUND

In an evolved packet system (EPS) network architecture defined by the 3rd Generation Partnership Project (3GPP), there is a scenario in which a Serving Gateway (SGW) and a Packet Data Network (PDN) gateway (PGW) are separately deployed.

In the scenario in which the SGW and the PGW are separately deployed, when a fault occurs in the PGW, it is defined in a 3GPP protocol that when sensing that a fault occurs in the PGW, the SGW sends, to an Mobility Management Entity (MME), a message for notifying the MME that a fault occurs in the PGW, so that the MME determines, after receiving the message, that a fault occurs in the PGW.

When receiving the message that is sent by the SGW and used for notifying that a fault occurs in the PGW, the MME needs to traverse context information in an information exchange system, delete a PDN connection established with the faulty PGW, and determine user equipment that need to be notified to reestablish a Packet Date Network (PDN) connection with the faulty PGW and to re-initiate a communication service request.

It is discovered by means of research that in a process in which the MME initiates PDN connection reestablishment when learning that a fault occurs in the PGW, a signaling transmission procedure of a PGW fault message is added, and moreover, an echo message negotiation on whether the procedure of the PGW fault message is supported needs to be performed between the MME and the SGW. As a result, a signaling transmission link is relatively long, resulting in low system service processing efficiency.

SUMMARY

Embodiments of the present disclosure provide a service processing method and device, which are used to solve the problem of low system service processing efficiency resulting from a long signaling transmission link caused by the fact that at present, when a fault occurs in a PGW, PGW reset is triggered by an MME.

According to a first aspect of the present disclosure, a service processing method is provided, including determining, by a serving gateway SGW, that an exception occurs in a packet data network gateway PGW; obtaining, by the SGW, a policy for deleting a packet data network PDN connection established between the SGW and the PGW; deleting, by the SGW according to the policy for deleting a PDN connection, a PDN connection between the SGW and the PGW; and sending, by the SGW, a deletion request message to a mobility management entity MME, where the deletion request message includes identity information of the deleted PDN connection and is used for notifying the MME to delete a PDN connection corresponding to the identity information.

With reference to the first aspect, in a first possible implementation manner, the deleting, by the SGW according to the policy for deleting a PDN connection, a packet data network PDN connection established between the SGW and the PGW includes determining, by the SGW according to types of services carried over PDN connections established between the SGW and the PGW, a priority sequence for deleting PDN connections carrying services of different types, and deleting a PDN connection that needs to be preferentially deleted.

With reference to the first possible implementation manner of the first aspect, in a second possible implementation manner, the determining, by the SGW according to types of services carried over PDN connections established between the SGW and the PGW, a priority sequence for deleting PDN connections carrying services of different types, and deleting a PDN connection that needs to be preferentially deleted includes: preferentially deleting a PDN connection carrying a voice service.

With reference to the first aspect, or in the first possible implementation manner of the first aspect, in a third possible implementation manner, the deleting, by the SGW according to the policy for deleting a PDN connection, a packet data network PDN connection established between the SGW and the PGW includes preferentially deleting, by the SGW, a PDN connection carrying a service request message sent by a user when receiving, in a process of deleting the PDN connection, the service request message.

With reference to third possible implementation manner of the first aspect, in a fourth possible implementation manner, the preferentially deleting, by the SGW, a PDN connection carrying a service request message sent by a user when receiving, in a process of deleting the PDN connection, the service request message includes determining, by the SGW, priorities of the multiple users, and preferentially deleting a PDN connection carrying a service request message sent by a user having a high priority when receiving, in the process of deleting the PDN connection, service request messages sent by multiple users.

With reference to the first aspect or in the first possible implementation manner of the first aspect, in a fifth possible implementation manner, the deleting, by the SGW according to the policy for deleting a PDN connection, a packet data network PDN connection established between the SGW and the PGW includes preferentially deleting, by the SGW, the PDN connection carrying uplink service data sent by the user when receiving, in the process of deleting the PDN connection, the uplink service data.

With reference to the fifth possible implementation manner of the first aspect, in a sixth possible implementation manner, the preferentially deleting a PDN connection carrying the uplink service data include preferentially deleting, by the SGW, a PDN connection carrying the uplink service data including the SIP signaling when determining that the uplink service data includes Session Initiation Protocol (SIP) signaling.

With reference to the first aspect or in the first possible implementation manner of the first aspect, or in the second possible implementation manner of the first aspect, or in the third possible implementation manner of the first aspect, or in the fourth possible implementation manner of the first aspect, in a seventh possible implementation manner, the deleting, by the SGW according to the policy for deleting a PDN connection, a packet data network PDN connection established between the SGW and the PGW includes preferentially deleting, by the SGW, the PDN connection belonging to the APN that is an IMS APN when determining that an access point name APN to which a PDN connection belongs is an Internet Protocol multimedia subsystem (IMS) access point name (APN) (IMS APN).

With reference to the first aspect or in the first possible implementation manner of the first aspect, or in the second possible implementation manner of the first aspect, or in the third possible implementation manner of the first aspect, or in the fourth possible implementation manner of the first aspect, or in the fifth possible implementation manner of the first aspect, or in the sixth possible implementation manner of the first aspect, or in the seventh possible implementation manner of the first aspect, in an eighth possible implementation manner, the deleting a packet data network PDN connection established between the SGW and the PGW includes traversing, by the serving gateway SGW, context information of the PDN connection established between the SGW and the PGW; and deleting, by the SGW according to the traversed context information, the packet data network PDN connection established between the SGW and the PGW.

With reference to the first aspect or in the first possible implementation manner of the first aspect, or in the second possible implementation manner of the first aspect, or in the third possible implementation manner of the first aspect, or in the fourth possible implementation manner of the first aspect, or in the fifth possible implementation manner of the first aspect, or in the sixth possible implementation manner of the first aspect, or in the seventh possible implementation manner of the first aspect, or in the eighth possible implementation manner of the first aspect, in a ninth possible implementation manner, the deletion request message further includes a cause value, where the cause value is used for instructing the MME to notify a user, of the deleted PDN connection, to re-initiate PDN connection reestablishment.

With reference to the first aspect or in the ninth possible implementation manner of the first aspect, in a tenth possible implementation manner, the deletion request message further includes identity information of a PGW; and the sending a deletion request message to a MME includes sending, by the SGW to the MME, deletion request message about the PDN connection corresponding to the context information, where the deletion request message is used for indicating that a fault occurs in the PGW corresponding to the identity information, so that when receiving the deletion request message, the MME deletes the PDN connection established with the PGW corresponding to the identity information, and selects another PGW for a user equipment establishing the deleted PDN connection.

According to a second aspect of the present disclosure, a service processing method is provided, including receiving, by a MME, a deletion request message sent by a serving gateway SGW, where the deletion request message includes identity information of a to-be-deleted PDN connection; and deleting, by the MME according to the deletion request message, the PDN connection corresponding to the identity information.

With reference to the second aspect, in a first possible implementation manner, the deletion request message further includes a cause value; and the method further includes notifying, by the MME according to the cause value included in the received deletion request message, a user to re-initiate PDN connection reestablishment for the deleted PDN connection.

With reference to the second aspect, or in the first possible implementation manner of the second aspect of the present disclosure, in a second possible implementation manner, the deletion request message further includes identity information of a PGW; and the method further includes deleting, by the MME according to the identity information of the PGW included in the received deletion request message, a PDN connection established with the PGW corresponding to the identity information, and selecting another PGW for a user equipment establishing the deleted PDN connection.

According to a third aspect of the present disclosure, a service processing device is provided, including a determining module configured to determine that an exception occurs in a packet data network gateway PGW; an obtaining module configured to obtain a policy for deleting a packet data network PDN connection established with the PGW; a deleting module configured to delete, according to the policy for deleting a PDN connection obtained by the obtaining module, a PDN connection established with the PGW; and a sending module configured to send a deletion request message to a MME, where the deletion request message includes identity information of the deleted PDN connection and is used for notifying the MME to delete a PDN connection corresponding to the identity information.

With reference to the third aspect, in a first possible implementation manner, the deleting module is further configured to determine, according to types of services carried over PDN connections established with the PGW, a priority sequence for deleting PDN connections carrying services of different types, and delete a PDN connection that needs to be preferentially deleted.

With reference to the first possible implementation manner of the third aspect, in a second possible implementation manner, the deleting module is further configured to preferentially delete a PDN connection carrying a voice service.

With reference to the third aspect, or in the first possible implementation manner of the third aspect, in a third possible implementation manner, the deleting module is further configured to, when a service request message sent by a user is received in a process of deleting the PDN connection, preferentially delete a PDN connection carrying the service request message.

With reference to the third possible implementation manner of the third aspect, in a fourth possible implementation manner, the deleting module is further configured to, when service request messages sent by multiple users are received in the process of deleting the PDN connection, determine priorities of the multiple users, and preferentially delete a PDN connection carrying a service request message sent by a user having a high priority.

With reference to the third aspect, or in the first possible implementation manner of the third aspect, in a fifth possible implementation manner, the deleting module is further configured to, when uplink service data sent by a user is received in a process of deleting the PDN connection, preferentially delete a PDN connection carrying the uplink service data.

With reference to the fifth possible implementation manner of the third aspect, in a sixth possible implementation manner, the deleting module is further configured to, when it is determined that the uplink service data includes Session Initiation Protocol SIP signaling, preferentially delete a PDN connection carrying the uplink service data including the SIP signaling.

With reference to the third aspect, in the first possible implementation manner of the third aspect, or in the second possible implementation manner of the third aspect, or in the third possible implementation manner of the third aspect, or in the fourth possible implementation manner of the third aspect, in a seventh possible implementation manner, the deleting module is further configured to: when it is determined that an access point name APN to which a PDN connection belongs is an IP multimedia subsystem access point name IMS APN, preferentially delete the PDN connection belonging to the APN that is an IMS APN.

With reference to the third aspect, or in the first possible implementation manner of the third aspect, or in the second possible implementation manner of the third aspect, or in the third possible implementation manner of the third aspect, or in the fourth possible implementation manner of the third aspect, or in the fifth possible implementation manner of the third aspect, or in the sixth possible implementation manner of the third aspect, or in the seventh possible implementation manner of the third aspect, in an eighth possible implementation manner, the deleting module is further configured to traverse context information of the PDN connection established with the PGW, and delete, according to the traversed context information, the packet data network PDN connection established with the PGW.

With reference to the third aspect, or in the first possible implementation manner of the third aspect, or in the second possible implementation manner of the third aspect, or in the third possible implementation manner of the third aspect, or in the fourth possible implementation manner of the third aspect, or in the fifth possible implementation manner of the third aspect, or in the sixth possible implementation manner of the third aspect, or in the seventh possible implementation manner of the third aspect, or in the eighth possible implementation manner of the third aspect, in a ninth possible implementation manner, the deletion request message further includes a cause value, where the cause value is used for instructing the MME to notify a user, of the deleted PDN connection, to re-initiate PDN connection reestablishment.

With reference to the third aspect, or in the ninth possible implementation manner of the third aspect, in a tenth possible implementation manner, the deletion request message further includes identity information of a PGW; and the sending module is further configured to send, to the mobility management entity MME, deletion request message about the PDN connection corresponding to the context information, where the deletion request message is used for indicating that a fault occurs in the PGW corresponding to the identity information, so that when receiving the deletion request message, the MME deletes the PDN connection established with the PGW corresponding to the identity information, and selects another PGW for a user equipment establishing the deleted PDN connection.

According to a fourth aspect of the present disclosure, a service processing device is provided, including: a receiving module configured to receive a deletion request message sent by a serving gateway SGW, where the deletion request message includes identity information of a to-be-deleted PDN connection; and a deleting module configured to delete, according to the deletion request message received by the receiving module, the PDN connection corresponding to the identity information.

With reference to the fourth aspect, in a first possible implementation manner, the deletion request message further includes a cause value; and the device further includes: a notifying module configured to notify, according to the cause value included in the deletion request message received by the receiving module, a user to re-initiate PDN connection reestablishment for the deleted PDN connection.

With reference to the fourth aspect, or in the first possible implementation manner of the fourth aspect of the present disclosure, in a second possible implementation manner, the deletion request message further includes identity information of a PGW; and the device further includes: a reselecting module configured to delete, according to the identity information of the PGW included in the deletion request message received by the receiving module, a PDN connection established with the PGW corresponding to the identity information, and select another PGW for a user equipment establishing the deleted PDN connection.

According to a fifth aspect of the present disclosure, a serving gateway SGW device is provided, including: a processor configured to determine that an exception occurs in a packet data network gateway PGW, obtain a policy for deleting a packet data network PDN connection established with the PGW, and delete a PDN connection established with the PGW according to the policy for deleting a PDN connection; and a signal transmitter configured to send a deletion request message to a mobility management entity MME, where the deletion request message includes identity information of the deleted PDN connection and is used for notifying the MME to delete a PDN connection corresponding to the identity information.

With reference to the fifth aspect, in a first possible implementation manner, the processor is further configured to determine, according to types of services carried over PDN connections established with the PGW, a priority sequence for deleting PDN connections carrying services of different types, and delete a PDN connection that needs to be preferentially deleted.

With reference to the first possible implementation manner of the fifth aspect, in a second possible implementation manner, the processor is further configured to preferentially delete a PDN connection carrying a voice service.

With reference to the fifth aspect, or in the first possible implementation manner of the fifth aspect, in a third possible implementation manner, the processor is further configured to: when receiving, in a process of deleting the PDN connection, a service request message sent by a user, preferentially delete a PDN connection carrying the service request message.

With reference to the third possible implementation manner of the fifth aspect, in a fourth possible implementation manner, the processor is further configured to: when receiving, in the process of deleting the PDN connection, service request messages sent by multiple users, determine priorities of the multiple users, and preferentially delete a PDN connection carrying a service request message sent by a user having a high priority.

With reference to the fifth aspect, or in the first possible implementation manner of the fifth aspect, in a fifth possible implementation manner, the processor is further configured to: when receiving, in a process of deleting the PDN connection, uplink service data sent by a user, preferentially delete a PDN connection carrying the uplink service data.

With reference to the fifth possible implementation manner of the fifth aspect, in a sixth possible implementation manner, the processor is further configured to preferentially delete a PDN connection carrying the uplink service data including the SIP signaling when determining that the uplink service data includes Session Initiation Protocol (SIP) signaling.

With reference to the fifth aspect, or in the first possible implementation manner of the fifth aspect, or in the second possible implementation manner of the fifth aspect, or in the third possible implementation manner of the fifth aspect, or in the fourth possible implementation manner of the fifth aspect, in a seventh possible implementation manner, the processor is further configured to, when determining that an APN to which a PDN connection belongs is an IMS APN, preferentially delete the PDN connection belonging to the APN that is an IMS APN.

With reference to the fifth aspect, or in the first possible implementation manner of the fifth aspect, or in the second possible implementation manner of the fifth aspect, or in the third possible implementation manner of the fifth aspect, or in the fourth possible implementation manner of the fifth aspect, or in the fifth possible implementation manner of the fifth aspect, or in the sixth possible implementation manner of the fifth aspect, or in the seventh possible implementation manner of the fifth aspect, in an eighth possible implementation manner, the processor is further configured to traverse context information of the PDN connection established with the PGW, and delete, according to the traversed context information, the packet data network PDN connection established with the PGW.

With reference to the fifth aspect, or in the first possible implementation manner of the fifth aspect, or in the second possible implementation manner of the fifth aspect, or in the third possible implementation manner of the fifth aspect, or in the fourth possible implementation manner of the fifth aspect, or in the fifth possible implementation manner of the fifth aspect, or in the sixth possible implementation manner of the fifth aspect, or in the seventh possible implementation manner of the fifth aspect, or in the eighth possible implementation manner of the fifth aspect, in a ninth possible implementation manner, the deletion request message further includes a cause value, where the cause value is used for instructing the MME to notify a user, of the deleted PDN connection, to re-initiate PDN connection reestablishment.

With reference to the fifth aspect, or in the ninth possible implementation manner of the fifth aspect, in a tenth possible implementation manner, the deletion request message further includes identity information of a PGW; and the signal transmitter is further configured to send, to the MME, deletion request message about the PDN connection corresponding to the context information, where the deletion request message is used for indicating that a fault occurs in the PGW corresponding to the identity information, so that when receiving the deletion request message, the MME deletes the PDN connection established with the PGW corresponding to the identity information, and selects another PGW for a user equipment establishing the deleted PDN connection.

According to a sixth aspect of the present disclosure, a MME device is provided, including a signal receiver configured to receive a deletion request message sent by a SGW, where the deletion request message includes identity information of a to-be-deleted PDN connection; and a processor configured to delete, according to the deletion request message received by the receiver, the PDN connection corresponding to the identity information.

With reference to the sixth aspect, in a first possible implementation manner, the deletion request message further includes a cause value, and wherein the processor is further configured to notify, according to the cause value included in the deletion request message received by the receiver, a user to re-initiate PDN connection reestablishment for the deleted PDN connection.

With reference to the sixth aspect, or in the first possible implementation manner of the sixth aspect of the present disclosure, in a second possible implementation manner, the deletion request message further includes identity information of a PGW, and wherein the processor is further configured to delete, according to the identity information of the PGW included in the deletion request message received by the receiver, a PDN connection established with the PGW corresponding to the identity information, and select another PGW for a user equipment establishing the deleted PDN connection.

Beneficial effects of the present disclosure are as follows:

In the embodiments of the present disclosure, a SGW determines that an exception occurs in a PGW, obtains a policy for deleting a PDN connection established between the SGW and the PGW, deletes a PDN connection between the SGW and the PGW according to the policy for deleting a PDN connection, and sends a deletion request message to a MME, where the deletion request message includes identity information of the deleted PDN connection and is used for notifying the MME to delete a PDN connection corresponding to the identity information. In this way, when determining that an exception occurs in the PGW, the SGW no longer needs to send information indicating that an exception occurs in the PGW to the MME, thereby reducing a quantity of transmitted signaling in a system, and simplifying a service processing procedure. Moreover, because different deletion policies are used, service processing is accelerated, service processing efficiency of the system is further increased, and user experience is improved.

DESCRIPTION OF EMBODIMENTS

To achieve objectives of the present disclosure, embodiments of the present disclosure provide a service processing method and device. A SGW determines that an exception occurs in a PGW, obtains a policy for deleting a packet data network PDN connection established between the SGW and the PGW, deletes a PDN connection between the SGW and the PGW according to the policy for deleting a PDN connection, and sends a deletion request message to a MME, where the deletion request message includes identity information of the deleted PDN connection and is used for notifying the MME to delete a PDN connection corresponding to the identity information. In this way, when determining that an exception occurs in the PGW, the SGW no longer needs to send information indicating that an exception occurs in the PGW to the MME, thereby reducing a quantity of transmitted signaling in a system, and simplifying a service processing procedure. Moreover, because different deletion policies are used, service processing is accelerated, service processing efficiency of the system is further increased, and user experience is improved.

The following describes the embodiments of the present disclosure in detail with reference to accompanying drawings in this specification.

Embodiment 1

Figure 1:
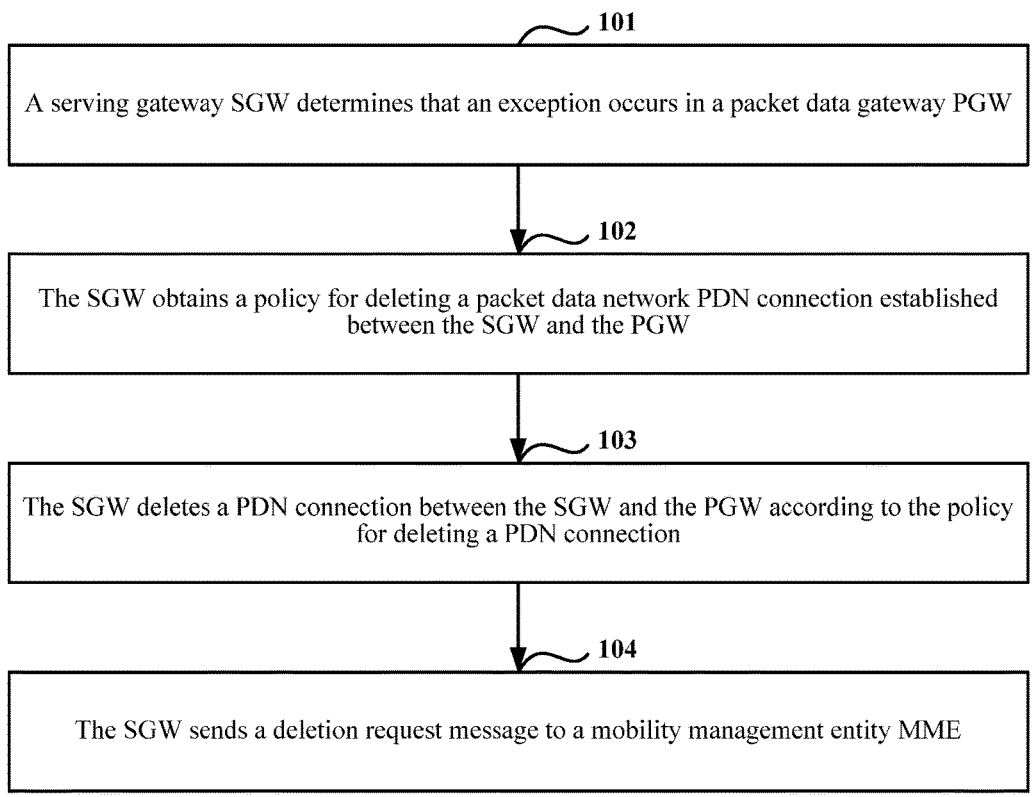
FIG. 1 is a schematic flowchart of a service processing method according to Embodiment 1 of the present disclosure.

As shown in FIG. 1, which is a schematic flowchart of a service processing method according to Embodiment 1 of the present disclosure, the method may be described as follows:

Step 101: An SGW determines that an exception occurs in a packet data network gateway PGW.

In step 101, a manner in which the SGW determines that an exception occurs in the PGW includes, but is not limited to:

A first manner: The SGW determines whether a fault occurs in the PGW by using a path detection mechanism.

A second manner: The SGW determines, according to a Recovery value carried in a negotiation message, that the PGW is restarted.

For example, the PGW sends an Echo Response message to the SGW, so that the SGW learns, according to a Recovery value included in the Echo Response message, that the PGW is restarted.

Alternatively, the SGW determines, according to a Recovery value carried in a general packet radio service (GPRS) tunneling protocol (GTP) message, that the PGW is restarted.

When determining that an exception occurs in the PGW, the SGW determines, according to a configuration policy, whether to respond to an exception event that occurs in the PGW.

Currently, it is defined in a 3GPP protocol that when determining that an exception occurs in a PGW, an SGW sends a deletion message to an MME to notify the MME that a fault occurs in the PGW, so that the MME deletes a PDN connection established with the PGW in which a fault already occurs and sends, according to locally stored identity information of a user equipment establishing a PDN connection with the PGW in which the fault already occurs, PDN connection reestablishment information to the user equipment corresponding to the identity information of the user equipment, or the MME reselects another PGW for the user equipment.

Therefore, when determining that an exception occurs in the PGW, the SGW may send a deletion message to the MME according to the 3GPP protocol, which is obviously not a manner recommended in the present disclosure.

Step 102: The SGW obtains a policy for deleting a packet data network PDN connection established between the SGW and the PGW.

In step 102, the policy, obtained by the SGW, for deleting a packet data network PDN connection established between the SGW and the PGW includes, but is not limited to:

Policy 1: For different service types, determine a priority sequence for deleting PDN connections carrying services of different types.

Assuming that service types are classified into a voice service type and a data service type, deletion of a PDN connection carrying a voice service precedes deletion of a PDN connection carrying a data service.

For example, types of services carried over PDN connections include a voice service, a video service, a web browsing service, and a background E-mail downloading service, and then a priority sequence for deleting PDN connections carrying the services of the foregoing types may be first deleting a PDN connection carrying the voice service, then deleting a PDN connection carrying the video service, then deleting a PDN connection carrying the web browsing service, and finally deleting a PDN connection carrying the background E-mail downloading service.

Policy 2: Determine, according to a service request message or uplink service data that is sent by a user and received in a PDN connection deletion process, a priority sequence for deleting PDN connections.

When the service request message or the uplink service data sent by the user is received, a PDN connection carrying the service request message or carrying the uplink service data is preferentially deleted.

That is, in the PDN connection deletion process, the PDN connection carrying the service request message is preferentially deleted, and the PDN connection carrying the uplink service data is preferentially deleted.

It should be noted that, when the service request message and the uplink service data are received, deletion of the PDN connection carrying the service request message and deletion of the PDN connection carrying the uplink service data may be executed according to a receiving sequence of the service request message and the uplink service data, which is not limited herein.

Policy 3: For identical service request messages or identical uplink service data, determine, according to priorities of users sending the service request messages or the uplink service data, a priority sequence for deleting PDN connections.

Policy 4: For received uplink service data, determine, according to whether the uplink service data includes SIP signaling, a priority sequence for deleting PDN connections.

Specifically, deletion of a PDN connection carrying uplink service data including the SIP signaling precedes deletion of a PDN connection carrying uplink service data not including the SIP signaling.

Policy 5: Determine, according to an APN to which a PDN connection belongs, a priority sequence for deleting PDN connections.

Specifically, when an APN to which a PDN connection belongs is an IMS APN, in the PDN connection deletion process, deletion of the PDN connection belonging to the APN that is an IMS APN precedes that of a PDN connection belonging to an APN that is not an IMS APN.

It should be noted that when the policy 1 to the policy 5 are used, a use priority sequence also exists: When more conditions are met, a deletion priority is higher.

Step 103: The SGW deletes a PDN connection between the SGW and the PGW according to the policy for deleting a PDN connection.

In step 103, when determining that an exception occurs in the PGW, the SGW traverses context information of each PDN connection established between the SGW and the PGW, so as to determine an attribute of each PDN connection.

It should be noted that an attribute of a PDN connection may refer to a type of a service carried over the PDN connection, access point information, or the like.

The SGW deletes, according to the traversed context information, the attribute of the PDN connection, and the policy for deleting a PDN connection, the PDN connection established between the SGW and the PGW.

During PDN connection deletion, a PDN connection carrying a service of a high-priority type is preferentially deleted, and a PDN connection belonging to an APN that is an IMS APN is preferentially deleted.

Specifically, during the PDN connection deletion, deletion of a PDN connection corresponding to a high-priority service type precedes deletion of a PDN connection corresponding to a low-priority service type.

During the PDN connection deletion, deletion of a PDN connection belonging to an APN that is an IMS APN precedes deletion of a PDN connection belonging to an APN that is not an IMS APN.

It should be noted that a high priority of a service type refers to that different priorities are configured for types of services carried over PDN connections. For example, a priority of a voice service is higher than a priority of a video service, the priority of the video service is higher than a priority of a web browsing service, and the priority of the web browsing service is higher than a priority of background E-mail downloading.

For example, because deletion of a PDN connection carrying a voice service precedes deletion of a PDN connection carrying a data service, when determining that an exception occurs in the PGW, the SGW may traverse at least twice context information of PDN connections established with the PGW.

In the first traversing process:

When traversing the context information of the PDN connections established with the PGW, determine a PDN connection carrying a voice service, and perform an operation of deleting the PDN connection.

When traversing the context information of the PDN connections established with the PGW, retain a PDN connection when determining that type information of a service on the PDN connection indicates a data service.

In the second traversing process:

When traversing the context information of the PDN connections established with the PGW, delete the PDN connection retained after the first traversing.

In this way, the voice service can be recovered preferentially, and service processing efficiency of system resources can be improved.

In the PDN connection deletion process, the SGW still receives a service request message or uplink service data sent by a user; in this case, according to the policy for deleting a PDN connection, deletion of a current PDN connection needs to be stopped, a PDN connection carrying the received service request message or the received uplink service data is found, the found PDN connection is preferentially deleted, and after the processing is completed, the foregoing PDN connection deletion operation is continued.

In another embodiment of the present disclosure, in the PDN connection deletion process, for the received uplink service data sent by the user, first, it is determined whether the uplink data includes SIP signaling; then, when it is determined that the uplink service data includes the SIP signaling, a PDN connection carrying the uplink service data including the SIP signaling is preferentially deleted.

It should be noted that deletion of the PDN connection carrying the uplink service data including the SIP signaling precedes deletion of a PDN connection carrying uplink service data not including the SIP signaling.

Step 104: The SGW sends a deletion request message to a mobility management entity MME.

The deletion request message includes identity information of the deleted PDN connection and is used for notifying the MME to delete a PDN connection corresponding to the identity information.

In step 104, when determining that an exception occurs in the PGW, the SGW deletes the PDN connection between the SGW and the faulty PGW; in this case, the deletion request message is sent to the MME, requiring the MME to delete, when receiving the deletion request message, the PDN connection corresponding to the identity information of the PDN connection included in the deletion request message.

In the present disclosure, when determining that an exception occurs in the PGW, the SGW performs an operation on the PDN connection established with the faulty PGW, thereby reducing signaling transmission between the SGW and the MME, and improving service processing efficiency of a system.

In another embodiment of the present disclosure, the deletion request message is sent to the MME, where the deletion request message further includes identity information of the PGW, and the deletion request message is further used for indicating that a fault occurs in the PGW corresponding to the identity information, so that when receiving the deletion request message, the MME determines the PGW in which the fault occurs, deletes a PDN connection currently established with the PGW corresponding to the identity information, and selects another PGW for a user equipment establishing the PDN connection.

It should be noted that the deletion request message further includes information, such as an IP address of an S5/S8 control plane of the PGW or an IP address of an S4/S11 interface of the PGW, for identifying a PGW fault.

In another embodiment of the present disclosure, the SGW sends the deletion request message (it should be noted that the deletion request message is a delete bearer request message) to the MME, where the deletion request message further includes a cause value of a Reactivation Request, so that when receiving the deletion request message including the cause value of the Reactivation Request, the MME deletes a specified PDN connection, and notifies a user equipment establishing the PDN connection with the PGW to re-initiate PDN connection reestablishment.

It should be noted that when receiving the deletion request message, the MME determines whether the user equipment has another PDN connection besides the PDN connection established with the faulty PGW; if not, the MME deletes the PDN connection established between the user equipment and the faulty PGW, and sends PDN connection reestablishment information to the user equipment, so that the user equipment establishes a new PDN connection with the PGW when receiving the PDN connection reestablishment information; and if yes, the MME releases, according to the cause value of the Reactivation Request included in the deletion request message, a PDN connection that is established between the user equipment and the faulty PGW and pointed to by the cause value of the Reactivation Request, and sends PDN connection reestablishment information to the user equipment, so that the user equipment establishes a new PDN connection with the PGW when receiving PDN connection reestablishment information.

By using the technical solution in Embodiment 1 of the present disclosure, a SGW determines that an exception occurs in a PGW, obtains a policy for deleting a PDN connection established between the SGW and the PGW, deletes a PDN connection between the SGW and the PGW according to the policy for deleting a PDN connection, and sends a deletion request message to a MME, where the deletion request message includes identity information of the deleted PDN connection and is used for notifying the MME to delete a PDN connection corresponding to the identity information. In this way, when determining that an exception occurs in the PGW, the SGW no longer needs to send information indicating that an exception occurs in the PGW to the MME, thereby reducing a quantity of transmitted signaling in a system, and simplifying a service processing procedure. Moreover, because different deletion policies are used, service processing is accelerated, service processing efficiency of the system is further increased, and user experience is improved.

Embodiment 2

Figure 2:
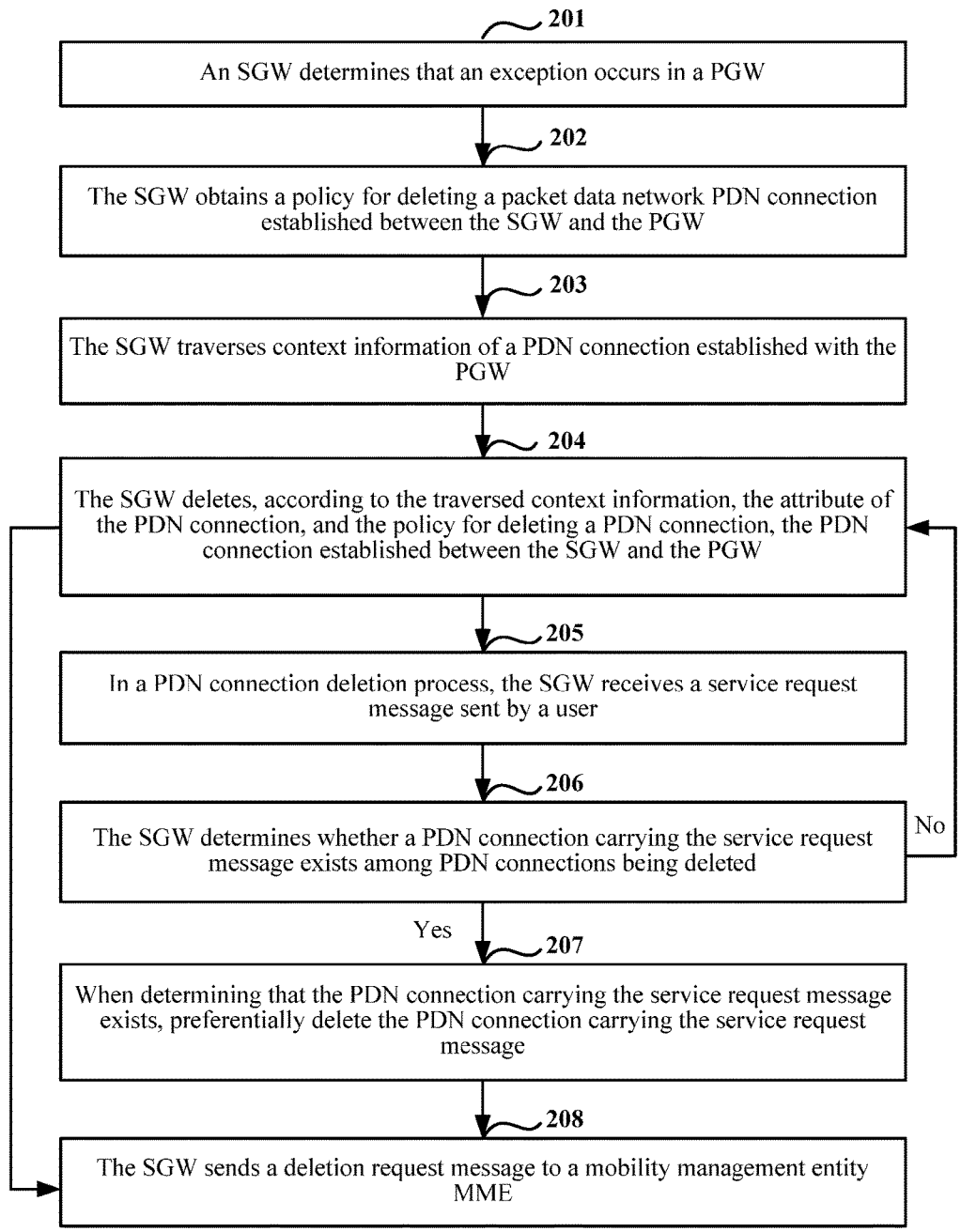
FIG. 2 is a schematic flowchart of a service processing method according to Embodiment 2 of the present disclosure.

As shown in FIG. 2, which is a schematic flowchart of a service processing method according to Embodiment 2 of the present disclosure, Embodiment 2 of the present disclosure and Embodiment 1 of the present disclosure are disclosures based on a same disclosure conception, and the method may be described as follows:

Step 201: An SGW determines that an exception occurs in a PGW.

In step 201, a manner in which the SGW determines that an exception occurs in the PGW includes, but is not limited to:

A first manner: The SGW determines whether a fault occurs in the PGW by using a path detection mechanism.

A second manner: The SGW determines, according to a Recovery value carried in a negotiation message, that the PGW is restarted.

For example, the PGW sends an Echo Response message to the SGW, so that the SGW learns, according to a Recovery value included in the Echo Response message, that the PGW is restarted.

Alternatively, the SGW determines, according to a Recovery value carried in a GTP message, that the PGW is restarted.

When determining that an exception occurs in the PGW, the SGW determines, according to a configuration policy, whether to respond to an exception event that occurs in the PGW.

Currently, it is defined in a 3GPP protocol that when determining that an exception occurs in a PGW, an SGW sends a deletion message to an MME to notify the MME that a fault occurs in the PGW, so that the MME deletes a PDN connection established with the PGW in which a fault already occurs and sends, according to locally stored identity information of a user equipment establishing a PDN connection with the PGW in which the fault already occurs, PDN connection reestablishment information to the user equipment corresponding to the identity information of the user equipment, or the MME reselects another PGW for the user equipment.

Therefore, when determining that an exception occurs in the PGW, the SGW may send a deletion message to the MME according to the 3GPP protocol, which is obviously not a manner recommended in the present disclosure.

In the present disclosure, when determining that an exception occurs in the PGW, the SGW performs a deletion operation on the PDN connection established with the faulty PGW, thereby reducing signaling transmission between the SGW and the MME, and improving service processing efficiency of a system.

Step 202: The SGW obtains a policy for deleting a packet data network PDN connection established between the SGW and the PGW.

In step 202, the policy, obtained by the SGW, for deleting a packet data network PDN connection established between the SGW and the PGW includes, but is not limited to:

Policy 1: For different service types, determine a priority sequence for deleting PDN connections carrying services of different types.

Assuming that service types are classified into a voice service type and a data service type, deletion of a PDN connection carrying a voice service precedes deletion of a PDN connection carrying a data service.

For example, types of services carried over PDN connections include a voice service, a video service, a web browsing service, and a background E-mail downloading service, and then a priority sequence for deleting PDN connections carrying the services of the foregoing types may be first deleting a PDN connection carrying the voice service, then deleting a PDN connection carrying the video service, then deleting a PDN connection carrying the web browsing service, and finally deleting a PDN connection carrying the background E-mail downloading service.

Policy 2: Determine, according to a service request message or uplink service data that is sent by a user and received in a PDN connection deletion process, a priority sequence for deleting PDN connections.

When the service request message or the uplink service data sent by the user is received, a PDN connection carrying the service request message or carrying the uplink service data is preferentially deleted.

That is, in the PDN connection deletion process, the PDN connection carrying the service request message is preferentially deleted, and the PDN connection carrying the uplink service data is preferentially deleted.

It should be noted that, when the service request message and the uplink service data are received, deletion of the PDN connection carrying the service request message and deletion of the PDN connection carrying the uplink service data may be executed according to a receiving sequence of the service request message and the uplink service data, which is not limited herein.

Policy 3: For identical service request messages or identical uplink service data, determine, according to priorities of users sending the service request messages or the uplink service data, a priority sequence for deleting PDN connections.

Policy 4: For received uplink service data, determine, according to whether the uplink service data includes SIP signaling, a priority sequence for deleting PDN connections.

Specifically, deletion of a PDN connection carrying uplink service data including the SIP signaling precedes deletion of a PDN connection carrying uplink service data not including the SIP signaling.

Policy 5: Determine, according to an APN to which a PDN connection belongs, a priority sequence for deleting PDN connections.

Specifically, when an APN to which a PDN connection belongs is an IMS APN, in the PDN connection deletion process, deletion of the PDN connection belonging to the APN that is an IMS APN precedes that of a PDN connection belonging to an APN that is not an IMS APN.

It should be noted that when the policy 1 to the policy 5 are used, a use priority sequence also exists. When more conditions are met, a deletion priority is higher.

Step 203: The SGW traverses context information of a PDN connection established with the PGW.

In step 203, the SGW traverses one piece of context information, and determines an attribute, corresponding to the traversed context information, of the PDN connection.

It should be noted that an attribute of a PDN connection may refer to a type of a service carried over the PDN connection, access point information, or the like.

Step 204: The SGW deletes, according to the traversed context information, the attribute of the PDN connection, and the policy for deleting a PDN connection, the PDN connection established between the SGW and the PGW, and turns to perform step 208.

In step 204, during PDN connection deletion, a PDN connection carrying a service of a high-priority type is preferentially deleted, and a PDN connection belonging to an APN that is an IMS APN is preferentially deleted.

Specifically, during the PDN connection deletion, deletion of a PDN connection corresponding to a high-priority service type precedes deletion of a PDN connection corresponding to a low-priority service type.

During the PDN connection deletion, deletion of a PDN connection belonging to an APN that is an IMS APN precedes deletion of a PDN connection belonging to an APN that is not an IMS APN.

It should be noted that a high priority of a service type refers to that different priorities are configured for types of services carried over PDN connections. For example, a priority of a voice service is higher than a priority of a video service, the priority of the video service is higher than a priority of a web browsing service, and the priority of the web browsing service is higher than a priority of background E-mail downloading.

For example, because deletion of a PDN connection carrying a voice service precedes deletion of a PDN connection carrying a data service, when determining that an exception occurs in the PGW, the SGW may traverse at least twice context information of PDN connections established with the PGW.

In the first traversing process:

When traversing the context information of the PDN connections established with the PGW, determine a PDN connection carrying a voice service, and perform an operation of deleting the PDN connection.

When traversing the context information of the PDN connections established with the PGW, retain a PDN connection when determining that type information of a service on the PDN connection indicates a data service.

In the second traversing process:

When traversing the context information of the PDN connections established with the PGW, delete the PDN connection retained after the first traversing.

In this way, the voice service can be recovered preferentially, and service processing efficiency of system resources can be improved.

Step 205: In a PDN connection deletion process, the SGW receives a service request message sent by a user.

Step 206: The SGW determines whether a PDN connection carrying the service request message exists among PDN connections being deleted, if yes, performs step 207, and otherwise, performs step 204 and at the same time responds to the service request message sent by the user.

Step 207: When determining that the PDN connection carrying the service request message exists, preferentially delete the PDN connection carrying the service request message, and turn to perform step 208.

In this way, a response time of a user equipment sending a service processing request message is shortened, and user experience is improved.

Step 208: The SGW sends a deletion request message to a mobility management entity MME.

The deletion request message includes identity information of the deleted PDN connection and is used for notifying the MME to delete a PDN connection corresponding to the identity information.

In step 208, when determining that an exception occurs in the PGW, the SGW deletes the PDN connection between the SGW and the faulty PGW; in this case, the deletion request message is sent to the MME, requiring the MME to delete, when receiving the deletion request message, the PDN connection corresponding to the identity information of the PDN connection included in the deletion request message.

In the present disclosure, when determining that an exception occurs in the PGW, the SGW performs an operation on the PDN connection established with the faulty PGW, thereby reducing signaling transmission between the SGW and the MME, and improving service processing efficiency of a system.

In another embodiment of the present disclosure, the deletion request message is sent to the MME, where the deletion request message further includes identity information of the PGW, and the deletion request message is further used for indicating that a fault occurs in the PGW corresponding to the identity information, so that when receiving the deletion request message, the MME determines the PGW in which the fault occurs, deletes a PDN connection established with the PGW corresponding to the identity information, and selects another PGW for a user equipment establishing the deleted PDN connection.

It should be noted that the deletion request message further includes information, such as an IP address of an S5/S8 control plane of the PGW or an IP address of an S4/S11 interface of the PGW, for identifying a PGW fault.

In another embodiment of the present disclosure, the SGW sends the deletion request message (it should be noted that the deletion request message is a delete bearer request message) to the MME, where the deletion request message further includes a cause value of a Reactivation Request, so that when receiving the deletion request message including the cause value of the Reactivation Request, the MME deletes a specified PDN connection, and notifies a user equipment establishing the PDN connection with the PGW to re-initiate PDN connection reestablishment.

It should be noted that when receiving the deletion request message, the MME determines whether the user equipment has another PDN connection besides the PDN connection established with the faulty PGW; if not, the MME deletes the PDN connection established between the user equipment and the faulty PGW, and sends PDN connection reestablishment information to the user equipment, so that the user equipment establishes a new PDN connection with the PGW when receiving the PDN connection reestablishment information; and if yes, the MME releases, according to the cause value of the Reactivation Request included in the deletion request message, a PDN connection that is established between the user equipment and the faulty PGW and pointed to by the cause value of the Reactivation Request, and sends PDN connection reestablishment information to the user equipment, so that the user equipment establishes a new PDN connection with the PGW when receiving PDN connection reestablishment information.

Embodiment 3

Figure 3:
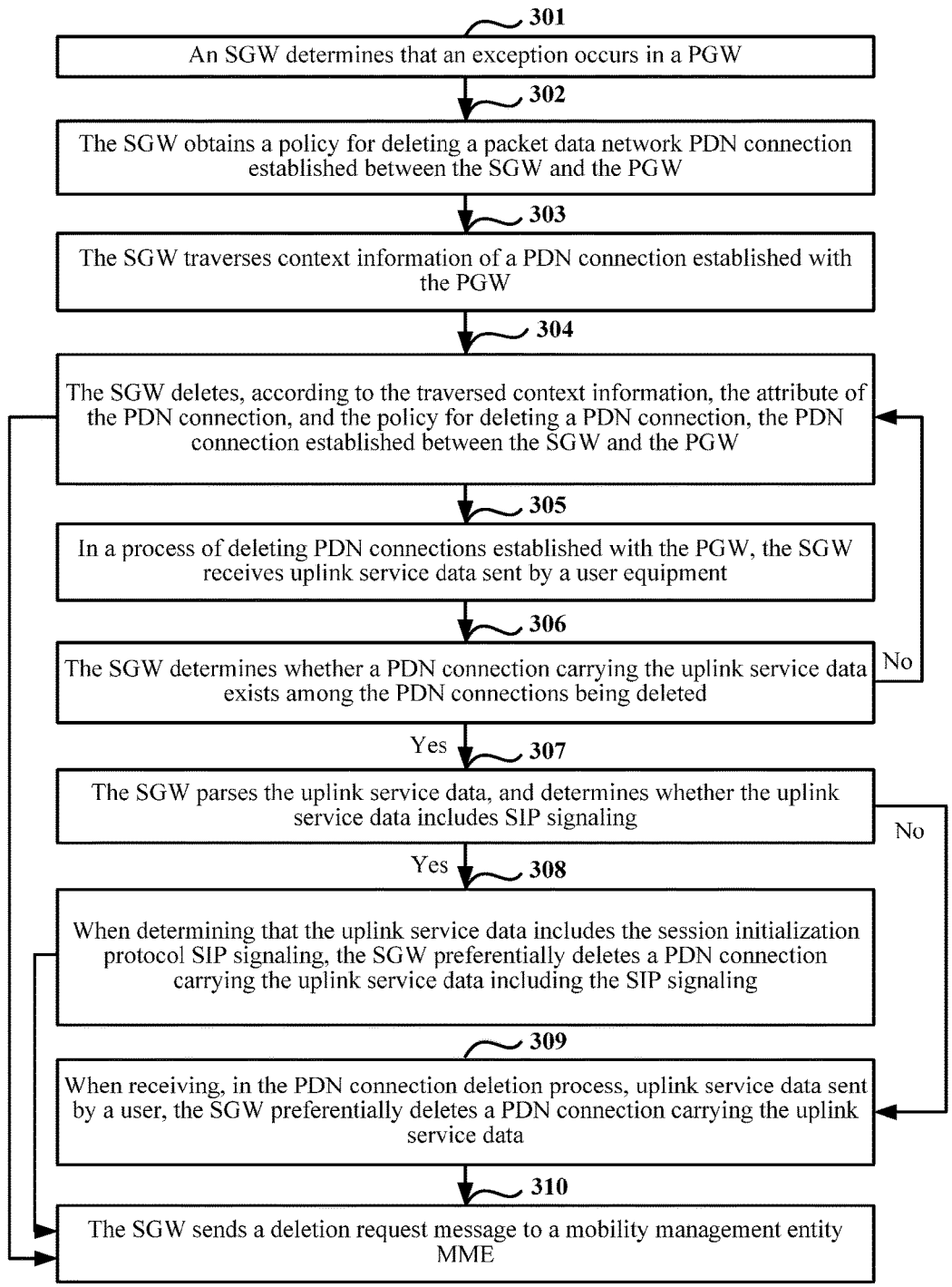
FIG. 3 is a schematic flowchart of a service processing method according to Embodiment 3 of the present disclosure.

As shown in FIG. 3, which is a schematic flowchart of a service processing method according to Embodiment 3 of the present disclosure, Embodiment 3 of the present disclosure and Embodiment 1 and Embodiment 2 of the present disclosure are disclosures based on a same disclosure conception, and the method may be described as follows:

Step 301: An SGW determines that an exception occurs in a PGW.

In step 301, a manner in which the SGW determines that an exception occurs in the PGW includes, but is not limited to:

A first manner: The SGW determines whether a fault occurs in the PGW by using a path detection mechanism.

A second manner: The SGW determines, according to a Recovery value carried in a negotiation message, that the PGW is restarted.

For example, the PGW sends an Echo Response message to the SGW, so that the SGW learns, according to a Recovery value included in the Echo Response message, that the PGW is restarted.

Alternatively, the SGW determines, according to a Recovery value carried in a GTP message, that the PGW is restarted.

When determining that an exception occurs in the PGW, the SGW determines, according to a configuration policy, whether to respond to an exception event that occurs in the PGW.

Currently, it is defined in a 3GPP protocol that: when determining that an exception occurs in a PGW, an SGW sends a deletion message to an MME to notify the MME that a fault occurs in the PGW, so that the MME deletes a PDN connection established with the PGW in which a fault already occurs and sends, according to locally stored identity information of a user equipment establishing a PDN connection with the PGW in which the fault already occurs, PDN connection reestablishment information to the user equipment corresponding to the identity information of the user equipment, or the MME reselects another PGW for the user equipment.

Therefore, when determining that an exception occurs in the PGW, the SGW may send a deletion message to the MME according to the 3GPP protocol, which is obviously not a manner recommended in the present disclosure.

In the present disclosure, when determining that an exception occurs in the PGW, the SGW performs a deletion operation on the PDN connection established with the faulty PGW, thereby reducing signaling transmission between the SGW and the MME, and improving service processing efficiency of a system.

Step 302: The SGW obtains a policy for deleting a packet data network PDN connection established between the SGW and the PGW.

In step 302, the policy, obtained by the SGW, for deleting a packet data network PDN connection established between the SGW and the PGW includes, but is not limited to:

Policy 1: For different service types, determine a priority sequence for deleting PDN connections carrying services of different types.

Assuming that service types are classified into a voice service type and a data service type, deletion of a PDN connection carrying a voice service precedes deletion of a PDN connection carrying a data service.

For example, types of services carried over PDN connections include a voice service, a video service, a web browsing service, and a background E-mail downloading service, and then a priority sequence for deleting PDN connections carrying the services of the foregoing types may be first deleting a PDN connection carrying the voice service, then deleting a PDN connection carrying the video service, then deleting a PDN connection carrying the web browsing service, and finally deleting a PDN connection carrying the background E-mail downloading service.

Policy 2: Determine, according to a service request message or uplink service data that is sent by a user and received in a PDN connection deletion process, a priority sequence for deleting PDN connections.

When the service request message or the uplink service data sent by the user is received, a PDN connection carrying the service request message or carrying the uplink service data is preferentially deleted.

That is, in the PDN connection deletion process, the PDN connection carrying the service request message is preferentially deleted, and the PDN connection carrying the uplink service data is preferentially deleted.

It should be noted that, when the service request message and the uplink service data are received, deletion of the PDN connection carrying the service request message and deletion of the PDN connection carrying the uplink service data may be executed according to a receiving sequence of the service request message and the uplink service data, which is not limited herein.

Policy 3: For identical service request messages or identical uplink service data, determine, according to priorities of users sending the service request messages or the uplink service data, a priority sequence for deleting PDN connections.

Policy 4: For received uplink service data, determine, according to whether the uplink service data includes SIP signaling, a priority sequence for deleting PDN connections.

Specifically, deletion of a PDN connection carrying uplink service data including the SIP signaling precedes deletion of a PDN connection carrying uplink service data not including the SIP signaling.

Policy 5: Determine, according to an APN to which a PDN connection belongs, a priority sequence for deleting PDN connections.

Specifically, when an APN to which a PDN connection belongs is an IMS APN, in the PDN connection deletion process, deletion of the PDN connection belonging to the APN that is an IMS APN precedes that of a PDN connection belonging to an APN that is not an IMS APN.

It should be noted that when the policy 1 to the policy 5 are used, a use priority sequence also exists. When more conditions are met, a deletion priority is higher.

Step 303: The SGW traverses context information of a PDN connection established with the PGW.

In step 303, the SGW traverses one piece of context information, and determines an attribute, corresponding to the traversed context information, of the PDN connection.

It should be noted that an attribute of a PDN connection may refer to a type of a service carried over the PDN connection, access point information, or the like.

Step 304: The SGW deletes, according to the traversed context information, the attribute of the PDN connection, and the policy for deleting a PDN connection, the PDN connection established between the SGW and the PGW, and turns to perform step 310.

In step 304, during PDN connection deletion, a PDN connection carrying a service of a high-priority type is preferentially deleted, and a PDN connection belonging to an APN that is an IMS APN is preferentially deleted.

Specifically, during the PDN connection deletion, deletion of a PDN connection corresponding to a high-priority service type precedes deletion of a PDN connection corresponding to a low-priority service type.

During the PDN connection deletion, deletion of a PDN connection belonging to an APN that is an IMS APN precedes deletion of a PDN connection belonging to an APN that is not an IMS APN.

It should be noted that a high priority of a service type refers to that different priorities are configured for types of services carried over PDN connections. For example, a priority of a voice service is higher than a priority of a video service, the priority of the video service is higher than a priority of a web browsing service, and the priority of the web browsing service is higher than a priority of background E-mail downloading.

For example, because deletion of a PDN connection carrying a voice service precedes deletion of a PDN connection carrying a data service, when determining that an exception occurs in the PGW, the SGW may traverse at least twice context information of PDN connections established with the PGW.

In the first traversing process:

When traversing the context information of the PDN connections established with the PGW, determine a PDN connection carrying a voice service, and perform an operation of deleting the PDN connection.

When traversing the context information of the PDN connections established with the PGW, retain a PDN connection when determining that type information of a service on the PDN connection indicates a data service.

In the second traversing process:

When traversing the context information of the PDN connections established with the PGW, delete the PDN connection retained after the first traversing.

In this way, the voice service can be recovered preferentially, and service processing efficiency of system resources can be improved.

Step 305: In a process of deleting PDN connections established with the PGW, the SGW receives uplink service data sent by a user equipment.

Step 306: The SGW determines whether a PDN connection carrying the uplink service data exists among the PDN connections being deleted, if yes, performs step 307, and otherwise, responds to the uplink service data and at the same time performs step 304.

Step 307: The SGW parses the uplink service data, determines whether the uplink service data includes SIP signaling, if yes, performs step 308, and otherwise, performs step 309.

Alternatively, it is determined whether an APN to which a PDN connection carrying the uplink service data belongs is an IMS APN.

Step 308: When determining that the uplink service data includes the SIP signaling, the SGW preferentially deletes a PDN connection carrying the uplink service data including the SIP signaling, and turns to perform step 310.

Step 309: When receiving, in the PDN connection deletion process, uplink service data sent by a user, the SGW preferentially deletes a PDN connection carrying the uplink service data, and turns to perform step 310.

It should be noted that when step 308 and step 309 are performed, a priority for performing step 308 is higher than a priority of step 309.

Step 310: The SGW sends a deletion request message to a mobility management entity MME.

The deletion request message includes identity information of the deleted PDN connection and is used for notifying the MME to delete a PDN connection corresponding to the identity information.

In step 310, when determining that an exception occurs in the PGW, the SGW deletes the PDN connection between the SGW and the faulty PGW; in this case, the deletion request message is sent to the MME, requiring the MME to delete, when receiving the deletion request message, the PDN connection corresponding to the identity information of the PDN connection included in the deletion request message.

In the present disclosure, when determining that an exception occurs in the PGW, the SGW performs an operation on the PDN connection established with the faulty PGW, thereby reducing signaling transmission between the SGW and the MME, and improving service processing efficiency of a system.

In another embodiment of the present disclosure, the deletion request message is sent to the MME, where the deletion request message further includes identity information of the PGW, and the deletion request message is further used for indicating that a fault occurs in the PGW corresponding to the identity information, so that when receiving the deletion request message, the MME determines the PGW in which the fault occurs, deletes a PDN connection established with the PGW corresponding to the identity information, and selects another PGW for a user equipment establishing the deleted PDN connection.

It should be noted that the deletion request message further includes information, such as an IP address of an S5/S8 control plane of the PGW or an IP address of an S4/S11 interface of the PGW, for identifying a PGW fault.

In another embodiment of the present disclosure, the SGW sends the deletion request message (it should be noted that the deletion request message is a delete bearer request message) to the MME, where the deletion request message further includes a cause value of a Reactivation Request, so that when receiving the deletion request message including the cause value of the Reactivation Request, the MME deletes a specified PDN connection, and notifies a user equipment establishing the PDN connection with the PGW to re-initiate PDN connection reestablishment.

It should be noted that when receiving the deletion request message, the MME determines whether the user equipment has another PDN connection besides the PDN connection established with the faulty PGW; if not, the MME deletes the PDN connection established between the user equipment and the faulty PGW, and sends PDN connection reestablishment information to the user equipment, so that the user equipment establishes a new PDN connection with the PGW when receiving the PDN connection reestablishment information; and if yes, the MME releases, according to the cause value of the Reactivation Request included in the deletion request message, a PDN connection that is established between the user equipment and the faulty PGW and pointed to by the cause value of the Reactivation Request, and sends PDN connection reestablishment information to the user equipment, so that the user equipment establishes a new PDN connection with the PGW when receiving PDN connection reestablishment information.

Embodiment 4

Figure 4:
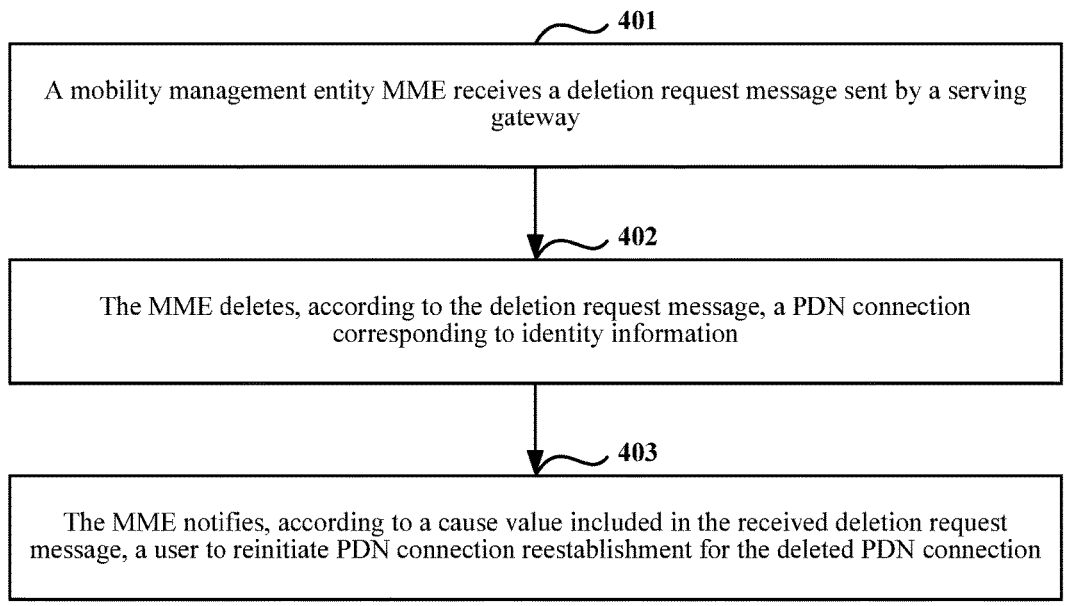
FIG. 4 is a schematic flowchart of a service processing method according to Embodiment 4 of the present disclosure.

As shown in FIG. 4, which is a schematic flowchart of a service processing method according to Embodiment 4 of the present disclosure, Embodiment 4 of the present disclosure and Embodiment 1, Embodiment 2, and Embodiment 3 of the present disclosure are disclosures based on a same disclosure conception, and the method may be described as follows:

Step 401: A MME receives a deletion request message sent by a serving gateway.

The deletion request message includes identity information of a to-be-deleted PDN connection.

The deletion request message further includes a cause value.

Step 402: The MME deletes, according to the deletion request message, a PDN connection corresponding to identity information.

Step 403: The MME notifies, according to the cause value included in the received deletion request message, a user to re-initiate PDN connection reestablishment for the deleted PDN connection.

In another embodiment of the present disclosure, the deletion request message further includes identity information of a PGW. The method further includes: deleting, by the MME according to the identity information of the PGW included in the received deletion request message, a PDN connection established with the PGW corresponding to the identity information, and selecting another PGW for a user equipment establishing the deleted PDN connection.

Embodiment 5

Figure 5:
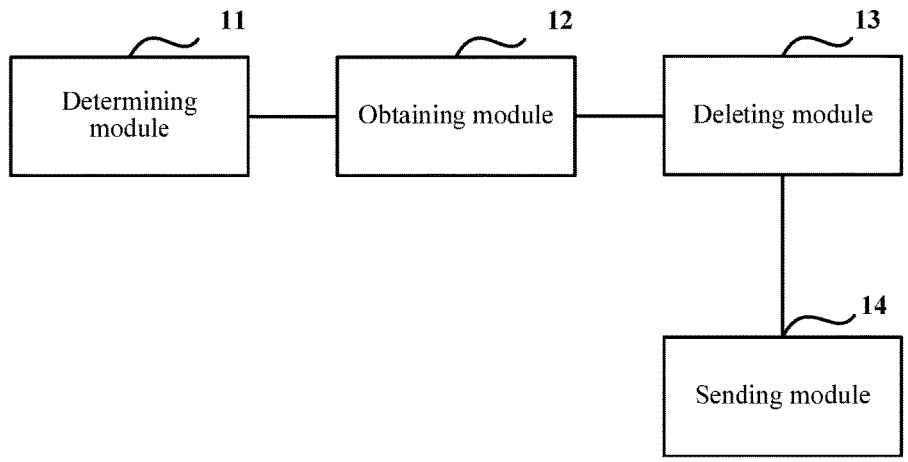
FIG. 5 is a schematic structural diagram of a service processing device according to Embodiment 5 of the present disclosure.

As shown in FIG. 5, which is a schematic structural diagram of a service processing device according to Embodiment 5 of the present disclosure, Embodiment 5 of the present disclosure and Embodiment 1 of the present disclosure to Embodiment 4 of the present disclosure are disclosures based on a same disclosure conception, and the device includes a determining module 11, an obtaining module 12, a deleting module 13, and a sending module 14, where the determining module 11 is configured to determine that an exception occurs in a packet data network gateway PGW; the obtaining module 12 is configured to obtain a policy for deleting a packet data network PDN connection established with the PGW; the deleting module 13 is configured to delete, according to the policy for deleting a PDN connection obtained by the obtaining module, a PDN connection established with the PGW; and the sending module 14 is configured to send a deletion request message to a MME, where the deletion request message includes identity information of the deleted PDN connection and is used for notifying the MME to delete a PDN connection corresponding to the identity information.

The deleting module 13 is further configured to determine, according to types of services carried over PDN connections established with the PGW, a priority sequence for deleting PDN connections carrying services of different types, and delete a PDN connection that needs to be preferentially deleted.

The deleting module 13 is further configured to preferentially delete a PDN connection carrying a voice service.

The deleting module 13 is further configured to, when a service request message sent by a user is received in a process of deleting the PDN connection, preferentially delete a PDN connection carrying the service request message.

The deleting module 13 is further configured to, when service request messages sent by multiple users are received in the process of deleting the PDN connection, determine priorities of the multiple users, and preferentially delete a PDN connection carrying a service request message sent by a user having a high priority.

The deleting module 13 is further configured to, when uplink service data sent by a user is received in a process of deleting the PDN connection, preferentially delete a PDN connection carrying the uplink service data.

The deleting module 13 is further configured to, when it is determined that the uplink service data includes SIP signaling, preferentially delete a PDN connection carrying the uplink service data including the SIP signaling.

The deleting module 13 is further configured to: when it is determined that an access point name APN to which a PDN connection belongs is an IMS APN, preferentially delete the PDN connection belonging to the APN that is an IMS APN.

The deleting module 13 is further configured to traverse context information of the PDN connection established with the PGW, and delete, according to the traversed context information, the packet data network PDN connection established with the PGW.

The deletion request message further includes a cause value, where the cause value is used for instructing the MME to notify a user, of the deleted PDN connection, to re-initiate PDN connection reestablishment.

The deletion request message further includes identity information of the PGW.

The sending module 14 is further configured to send, to the MME, deletion request message about the PDN connection corresponding to the context information, where the deletion request message is used for indicating that a fault occurs in the PGW corresponding to the identity information, so that when receiving the deletion request message, the MME deletes the PDN connection established with the PGW corresponding to the identity information, and selects another PGW for a user equipment establishing the deleted PDN connection.

It should be noted that the device described in Embodiment 5 of the present disclosure may be a device implemented in a hardware form, and may also be a device implemented in a software form, which is not limited herein.

Embodiment 6

Figure 6:
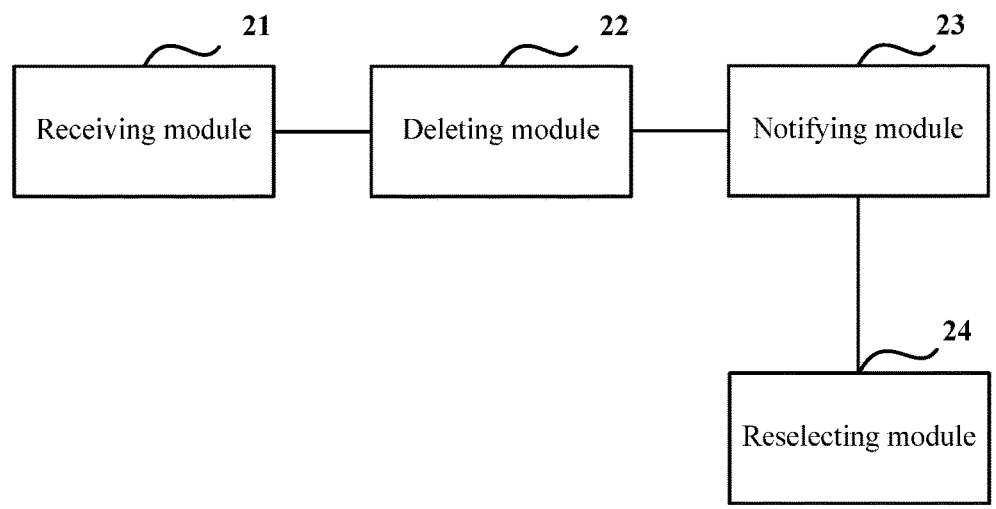
FIG. 6 is a schematic structural diagram of a service processing device according to Embodiment 6 of the present disclosure.

As shown in FIG. 6, which is a schematic structural diagram of a service processing device according to Embodiment 6 of the present disclosure, Embodiment 6 of the present disclosure and Embodiment 1 of the present disclosure to Embodiment 5 of the present disclosure are disclosures based on a same disclosure conception, and the device includes a receiving module 21 and a deleting module 22, where the receiving module 21 is configured to receive a deletion request message sent by a SGW, where the deletion request message includes identity information of a to-be-deleted PDN connection, and the deleting module 22 is configured to delete, according to the deletion request message received by the receiving module, the PDN connection corresponding to the identity information.

The deletion request message further includes a cause value.

The device further includes a notifying module 23, where the notifying module 23 is configured to notify, according to the cause value included in the deletion request message received by the receiving module, a user to re-initiate PDN connection reestablishment for the deleted PDN connection.

The deletion request message further includes identity information of a PGW.

The device further includes a reselecting module 24, where the reselecting module 24 is configured to delete, according to the identity information of the PGW included in the deletion request message received by the receiving module, a PDN connection established with the PGW corresponding to the identity information, and select another PGW for a user equipment establishing the deleted PDN connection.

It should be noted that the device described in Embodiment 5 of the present disclosure may be a device implemented in a hardware form, and may also be a device implemented in a software form, which is not limited herein.

Embodiment 7

Figure 7:
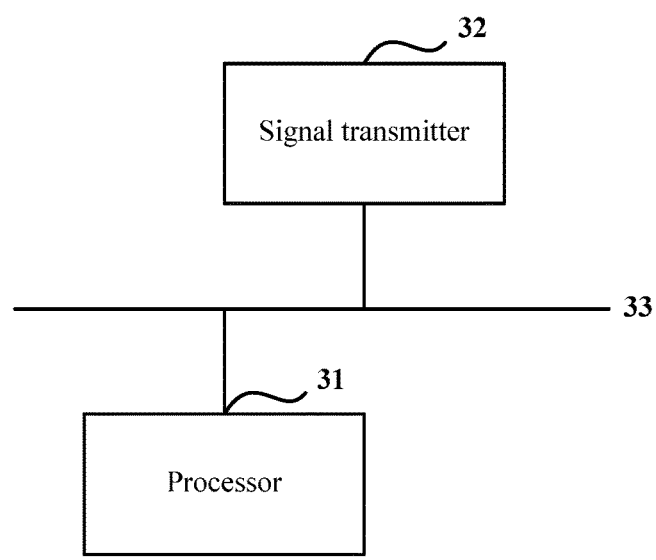
FIG. 7 is a schematic structural diagram of a serving gateway (SGW) device according to Embodiment 7 of the present disclosure.

As shown in FIG. 7, which is a schematic structural diagram of a serving gateway SGW device according to Embodiment 7 of the present disclosure, Embodiment 7 of the present disclosure and Embodiment 1 of the present disclosure to Embodiment 6 of the present disclosure are disclosures based on a same disclosure conception, and the device includes a processor 31 and a signal transmitter 32, where the processor 31 and the signal transmitter 32 are connected by using a bus 33.

The processor 31 is configured to determine that an exception occurs in a PGW, obtain a policy for deleting a PDN connection established with the PGW, and delete a PDN connection established with the PGW according to the policy for deleting a PDN connection.

The signal transmitter 32 is configured to send a deletion request message to a MME, where the deletion request message includes identity information of the deleted PDN connection and is used for notifying the MME to delete a PDN connection corresponding to the identity information.

The processor 31 is further configured to determine, according to types of services carried over PDN connections established with the PGW, a priority sequence for deleting PDN connections carrying services of different types, and delete a PDN connection that needs to be preferentially deleted.

The processor 31 is further configured to preferentially delete a PDN connection carrying a voice service.

The processor 31 is further configured to, when receiving, in a process of deleting the PDN connection, a service request message sent by a user, preferentially delete a PDN connection carrying the service request message.

The processor 31 is further configured to, when receiving, in the process of deleting the PDN connection, service request messages sent by multiple users, determine priorities of the multiple users, and preferentially delete a PDN connection carrying a service request message sent by a user having a high priority.

The processor 31 is further configured to, when receiving, in a process of deleting the PDN connection, uplink service data sent by a user, preferentially delete a PDN connection carrying the uplink service data.

The processor 31 is further configured to, when determining that the uplink service data includes SIP signaling, preferentially delete a PDN connection carrying the uplink service data including the SIP signaling.

The processor 31 is further configured to, when determining that an APN to which a PDN connection belongs is an IMS APN, preferentially delete the PDN connection belonging to the APN that is an IMS APN.

The processor 31 is further configured to traverse context information of the PDN connection established with the PGW, and delete, according to the traversed context information, the packet data network PDN connection established with the PGW.

The deletion request message further includes a cause value, where the cause value is used for instructing the MME to notify a user, of the deleted PDN connection, to re-initiate PDN connection reestablishment.

The deletion request message further includes identity information of the PGW.

The signal transmitter 32 is further configured to send, to the MME, deletion request message about the PDN connection corresponding to the context information, where the deletion request message is used for indicating that a fault occurs in the PGW corresponding to the identity information, so that when receiving the deletion request message, the MME deletes the PDN connection established with the PGW corresponding to the identity information, and selects another PGW for a user equipment establishing the deleted PDN connection.

Embodiment 8

Figure 8:
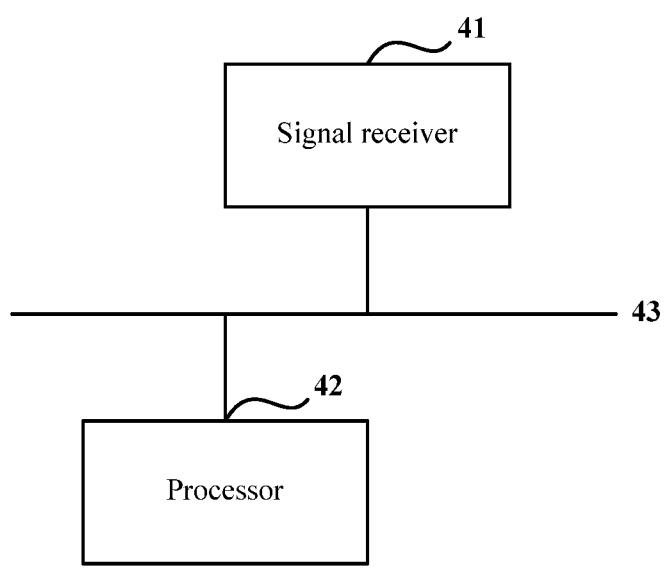
FIG. 8 is a schematic structural diagram of a mobility management entity (MME) device according to Embodiment 8 of the present disclosure.

As shown in FIG. 8, which is a schematic structural diagram of a MME device according to Embodiment 8 of the present disclosure, Embodiment 8 of the present disclosure and Embodiment 1 of the present disclosure to Embodiment 7 of the present disclosure are disclosures based on a same disclosure conception, and the device includes a signal receiver 41 and a processor 42, where the signal receiver 41 and the processor 42 are connected by using a bus 43.

The signal receiver 41 is configured to receive a deletion request message sent by a SGW, where the deletion request message includes identity information of a to-be-deleted PDN connection.

The processor 42 is configured to delete, according to the deletion request message received by the receiver, the PDN connection corresponding to the identity information.

The deletion request message further includes a cause value.

The processor 42 is further configured to notify, according to the cause value included in the deletion request message received by the receiver, a user to re-initiate PDN connection reestablishment for the deleted PDN connection.

The deletion request message further includes identity information of a PGW.

The processor 42 is further configured to delete, according to the identity information of the PGW included in the deletion request message received by the receiver, a PDN connection established with the PGW corresponding to the identity information, and select another PGW for a user equipment establishing the deleted PDN connection.

It should be noted that the bus involved in the embodiments of the present disclosure may be a peripheral component interconnect (PCI) bus, an extended industry standard architecture (EISA) bus, or the like. The bus may be classified into an address bus, a data bus, a control bus, and the like.

The processor involved in the embodiments of the present disclosure may be a central processing unit (CPU), and may also be another device having a control function, which is not limited herein.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A service processing method, comprising:
   determining, by a serving gateway (SGW), that an exception occurs in a packet data network gateway (PGW);
   obtaining, by the SGW, policies for deleting a packet data network (PDN) connection established between the SGW and the PGW, the policies comprising a first policy and a second policy, the first policy comprising deleting a PDN connection of a user with a higher priority before deleting a PDN connection of a user with a lower priority, and the second policy comprising deleting a PDN connection of a service with a higher priority before deleting a PDN connection of a service with a lower priority;
   deleting, by the SGW and according to the policies for deleting the PDN connection, the PDN connection established between the SGW and the PGW; and
   sending, by the SGW, a deletion request message to a mobility management entity (MME), the deletion request message comprising identity information of the deleted PDN connection and notifying the MME of deletion of the PDN connection corresponding to the identity information.

2. The method according to claim 1, wherein deleting the PDN connection established between the SGW and the PGW comprises:
   determining, by the SGW and according to types of services carried over PDN connections established between the SGW and the PGW, a priority sequence for deleting PDN connections carrying services of different types; and
   deleting a PDN connection that needs to be preferentially deleted.

3. The method according to claim 2, wherein deleting the PDN connection that needs to be preferentially deleted comprises preferentially deleting a PDN connection carrying a voice service before deleting a PDN connection carrying a data service.

4. The method according to claim 1, wherein deleting the PDN connection established between the SGW and the PGW comprises either:
   preferentially deleting, by the SGW, a PDN connection carrying a service request message from a user when receiving, in a process of deleting the PDN connection, the service request message; or
   preferentially deleting, by the SGW, the PDN connection carrying uplink service data from the user when receiving, in the process of deleting the PDN connection, the uplink service data.

5. The method according to claim 4, wherein preferentially deleting the PDN connection carrying the service request message comprises either:
   determining, by the SGW, priorities of the multiple users and preferentially deleting a PDN connection carrying a service request message from a user having a high priority when receiving, in the process of deleting the PDN connection, service request messages from multiple users; or
   preferentially deleting the PDN connection carrying the uplink service data comprises preferentially deleting, by the SGW, a PDN connection carrying the uplink service data comprising Session Initiation Protocol (SIP) signaling when the uplink service data comprises the SIP signaling.

6. The method according to claim 1, wherein deleting the PDN connection established between the SGW and the PGW comprises preferentially deleting, by the SGW, the PDN connection belonging to an access point name (APN) that is an Internet Protocol multimedia subsystem (IMS) APN when the APN to which a PDN connection belongs is the IMS APN.

7. The method according to claim 1, wherein deleting the PDN connection established between the SGW and the PGW comprises:
   traversing, by the SGW, context information of the PDN connection established between the SGW and the PGW; and
   deleting, by the SGW and according to the traversed context information, the packet data network PDN connection established between the SGW and the PGW.

8. A service processing method, comprising:
receiving, by a mobility management entity (MME), a deletion request message from a serving gateway (SGW), the deletion request message comprising identity information of a to-be-deleted packet data network (PDN) connection, the to-be-deleted PDN connection being selected according to policies, the policies comprising a first policy and a second policy, the first policy comprising deleting a PDN connection of a user with a higher priority before deleting a PDN connection of a user with a lower priority, and the second policy comprising deleting a PDN connection of a service with a higher priority before deleting a PDN connection of a service with a lower priority; and
deleting, by the MME according to the deletion request message, the PDN connection corresponding to the identity information.

9. The method according to claim 8, wherein the deletion request message further comprises a cause value, and the method further comprises notifying, by the MME and according to the cause value that is part of the received deletion request message, a user to re-initiate PDN connection reestablishment for the deleted PDN connection.

10. The method according to claim 8, wherein the deletion request message further comprises identity information of a packet data network gateway (PGW), and the method further comprises:
deleting, by the MME and according to the identity information of the PGW that is part of the received deletion request message, a PDN connection established with the PGW corresponding to the identity information; and
selecting another PGW for a user equipment establishing the deleted PDN connection.

11. A serving gateway (SGW) device, comprising:
a processor configured to:
determine that an exception occurs in a packet data network gateway (PGW);
obtain policies for deleting a packet data network (PDN) connection established with the PGW, the policies comprising a first policy and a second policy, the first policy comprising deleting a PDN connection of a user with a higher priority before deleting a PDN connection of a user with a lower priority, and the second policy comprising deleting a PDN connection of a service with a higher priority before deleting a PDN connection of a service with a lower priority; and
delete the PDN connection established with the PGW according to the policies for deleting a PDN connection; and
a signal transmitter coupled to the processor and configured to send a deletion request message to a mobility management entity (MME), the deletion request message comprising identity information of the deleted PDN connection and notifying the MME to delete the PDN connection corresponding to the identity information.

12. The device according to claim 11, wherein the processor is further configured to:
determine, according to types of services carried over PDN connections established with the PGW, a priority sequence for deleting PDN connections carrying services of different types; and
delete a PDN connection that needs to be preferentially deleted.

13. The device according to claim 12, wherein the processor is further configured to preferentially delete a PDN connection carrying a voice service.

14. The device according to claim 11, wherein the processor is further configured to either:
preferentially delete a PDN connection carrying a service request message from a user when receiving the service request message; or
preferentially delete a PDN connection carrying uplink service data from a user when receiving, in a process of deleting the PDN connection, the uplink service data.

15. The device according to claim 14, wherein in deleting the PDN connection carrying the service request message, the processor is further configured to either:
determine priorities of multiple users and preferentially delete a PDN connection carrying a service request message from a user having a high priority when receiving, in the process of deleting the PDN connection, service request messages from the multiple users; or
in deleting a PDN connection carrying the uplink service data, the processor is further configured to preferentially delete a PDN connection carrying the uplink service data comprising a Session Initiated Protocol (SIP) signaling when the uplink service data comprises the SIP signaling.

16. The device according to claim 11, wherein the processor is further configured to preferentially delete the PDN connection belonging to an access point name (APN) that is an Internet Protocol multimedia subsystem (IMS) APN when an APN to which a PDN connection belongs is an IP multimedia subsystem access point name (IMS APN).

17. The device according to claim 11, wherein the processor is further configured to:
traverse context information of the PDN connection established with the PGW; and
delete, according to the traversed context information, the PDN connection established with the PGW.

18. A mobility management entity (MME) device, comprising:
a signal receiver configured to receive a deletion request message from a serving gateway (SGW), the deletion request message comprising identity information of a to-be-deleted PDN connection, the to-be-deleted PDN connection being selected according to policies, the policies comprising a first policy and a second policy, the first policy comprising deleting a PDN connection of a user with a higher priority before deleting a PDN connection of a user with a lower priority, and the second policy comprising deleting a PDN connection of a service with a higher priority before deleting a PDN connection of a service with a lower priority; and
a processor coupled to the signal receiver and configured to delete, according to the deletion request message received by the signal receiver, the PDN connection corresponding to the identity information.

19. The device according to claim 18, wherein the deletion request message further comprises a cause value, and the processor is further configured to notify, according to the cause value that is part of the deletion request message received by the receiver, a user to re-initiate PDN connection reestablishment for the deleted PDN connection.

20. The device according to claim 18, wherein the deletion request message further comprises identity information of a packet data network gateway (PGW), and the processor is further configured to:

delete, according to the identity information of the PGW that is part of the deletion request message received by the receiver, a PDN connection established with the PGW corresponding to the identity information; and
select another PGW for a user equipment establishing the deleted PDN connection.

* * * * *